Oct. 4, 1932.    I. E. McCABE    1,881,321
CONSTANT CURRENT TRANSFORMER ACTUATED CONTROL SYSTEM
Filed April 23, 1930    7 Sheets-Sheet 1

NORMAL IDLE POSITION

Fig. 1

INVENTOR
IRA E. McCABE
BY Langdon Moore
ATTORNEY

Oct. 4, 1932.　　　　I. E. McCABE　　　　1,881,321
CONSTANT CURRENT TRANSFORMER ACTUATED CONTROL SYSTEM
Filed April 23, 1930　　7 Sheets-Sheet 2

Fig. 2

INVENTOR
IRA E. McCABE
BY
ATTORNEY

POSITION UPON INITIAL FAILURE OF IGNITION
Fig. 4

INVENTOR
IRA E. McCABE
BY Langdon Moore
ATTORNEY

Fig. 7

POSITION UPON CURRENT INTERRUPTION WITH MOTOR SWITCH CLOSED BUT STACK SWITCH OPEN

POSITION UPON CURRENT INTERRUPTION WITH MOTOR AND STACK SWITCHES CLOSED AND IGNITION SWITCH CLOSED

POSITION UPON MOMENTARY CURRENT INTERRUPTION DURING NORMAL RUNNING

Fig. 10

Patented Oct. 4, 1932

1,881,321

UNITED STATES PATENT OFFICE

IRA E. McCABE, OF CHICAGO, ILLINOIS

CONSTANT CURRENT TRANSFORMER ACTUATED CONTROL SYSTEM

Application filed April 23, 1930. Serial No. 446,573.

This invention relates to improvements in electrical control devices and more particularly to a constant current transformer actuated control system especially adapted for electrically operated or actuated fluid fuel burner mechanisms.

It is customary to provide fluid fuel burner mechanisms employed for domestic heating purposes with a room thermostat which automatically starts and stops the burner in accordance with the temperature desired in the building and in addition thereto it is desirable to provide control devices which provide electrical means for igniting the fuel when supplied by the mechanism and other means in the form of safety devices to cause the burner mechanism to shut down in case the fuel fails to ignite upon initial operation of the mechanism or if the flame fails or is extinguished during operation.

It is an object of this invention to provide a control device which provides in a single instrument means actuated by the closing of the room thermostat, or other switch in the circuit of the system, which will first operate the electrical ignition device, then operate the mechanism to supply the fuel and, a sufficient time thereafter for the fuel to be ignited, discontinue the operation of the ignition device, also in case of failure to secure ignition of the fuel to shut down the mechanism and require a manual resetting of the control before operation can be resumed, as well as upon failure of the combustion after initiated or upon an interruption of the commercial line current at any time while the room thermostat or switch is closed to shut down the burner mechanism and cause the parts to assume the normal cold position and to recycle or perform the normal starting operation immediately upon the resumption of the current without a manual reset. In the case of such failure of combustion, if the cause has not been removed there will be no initial ignition when the mechanism recycles and there will result a shut down then requiring a manual reset. In the event of a current interruption, the time required for the recycling or restarting operation is always sufficient to allow the unburned vapors in the combustion chamber to become dissipated.

It is a further object of this invention to provide a constant current transformer which supplies a current of constant intensity to the ignition device and the control actuating mechanism to then close the circuit to cause the burner mechanism to supply fuel and thereafter automatically open the transformer circuit. The provision of a constant current passing through the ignition circuit makes it possible to interpose therein a suitable electrical resistance element that will always become incandescent after the current has passed therethrough for a known time, that will not burn out and not be affected by carbon deposited thereon and therefore provide a reliable ignition device. Furthermore, the constant current allows the interposition in the ignition circuit of a thermal member for coacting with other parts for causing the burner motor switch to close and the ignition switch to open, such as a strip of bimetallic metal, which will produce a known movement in a known time after the circuit is closed therethrough. The including in the ignition circuit of the thermal member actuated by the passage of the current therethrough to coact with other parts to close the motor switch will prevent the initial supply of fuel to the burner mechanism if the ignition circuit becomes inoperative for any reason, such as the ignition device becoming defective or a broken connection in the ignition circuit, because the thermal element will then remain cold and immovable.

This invention also contemplates employing the weight and movement of the coil of the constant current transformer that is electrically repelled or caused to float above the other coil when the transformer is energized to actuate the control in such a manner that when the burner mechanism is shut down and the transformer deenergized the weight of the moveable coil prevents any operation of the burner mechanism and the floating of the moveable coil when the transformer is energized immediately not only sets up a current of constant intensity in the ignition circuit but also releases and allows other coacting parts to proceed to cause the closing of the circuit to the burner mechanism to supply fuel and thereafter cause the opening of the ignition circuit. This invention further contemplates the provision of means caused to operate upon the establishment of combustion of the fuel and act before the circuit to the transformer is opened to support the weight of the floating coil when deenergized during the normal operation and upon the occurrence of an abnormal condition, such as a flame failure or current interruption, to employ the supported weight of the dead or deenergized coil to cause a shut down of the burner mechanism.

The intensity of the commercial current varies in different localities and sometimes varies in the same locality. By connecting the commercial line to the primary coil of a constant current transformer and a hot wire ignition device in the secondary a current of constant intensity passes through the circuit of the ignition device. If the voltage of the commercial line is too low to induce a secondary current of sufficient intensity to heat the resistance ignition device to incandescency the primary coil will not float and therefore the control will not operate. No matter how much the commercial voltage fluctuates within reasonable limits about that required to operate the ignition device, the current passing through that circuit is substantially constant.

This invention contemplates that the circuit through the transformer be normally closed by a switch in the control, and as this switch controls the ignition circuit it will hereinafter be referred to as the ignition switch. It also contemplates that the circuit to the electrically operated or actuated burner mechanism be normally opened by a switch in the control, which will be hereinafter called the motor switch, and the closing of the motor switch may either operate a motor to pump or otherwise supply liquid fuel or a valve to allow the flow of a liquid or gaseous fuel. Therefore, the closing of the room thermostat first closes the line circuit through the transformer, then through both transformer and motor and then through the motor alone.

Different types of burner mechanisms in which a hot wire ignition device is employed require different lengths of time for the heating of the ignition device before the fuel is supplied and different times after the fuel is supplied before the ignition device is cut out. In an ignition circuit of constant known or determined constant intensity, and as provided by this invention, the period of pre-heating or pre-ignition may be readily determined and adjusted as required for any particular burner and likewise the period of post-heating or post-ignition.

This invention also contemplates the employment of a holding magnet in the control which in turn is controlled by a switch responsive to the presence or absence of the flame from the ignited fuel so that when ignition occurs the magnet is energized. It is contemplated that the energizing of the magnet cooperates to hold the motor switch in closed position as long as ignition occurs normally and at the same time causes the supporting of the weight of the floating coil after the ignition switch has opened.

This invention also contemplates the provision and arrangement of parts responsive to both the weight of the dead coil and presence or absence of the fuel flame to cooperate upon a current interruption to cause a shut down of the burner mechanism and to cause a recycling of the control to again go through the movements of a normal start upon resumption of the current whether the interruption be momentary or for a long period.

In the drawings:

Figure 5 is a detail view in front elevation.

Figure 1:
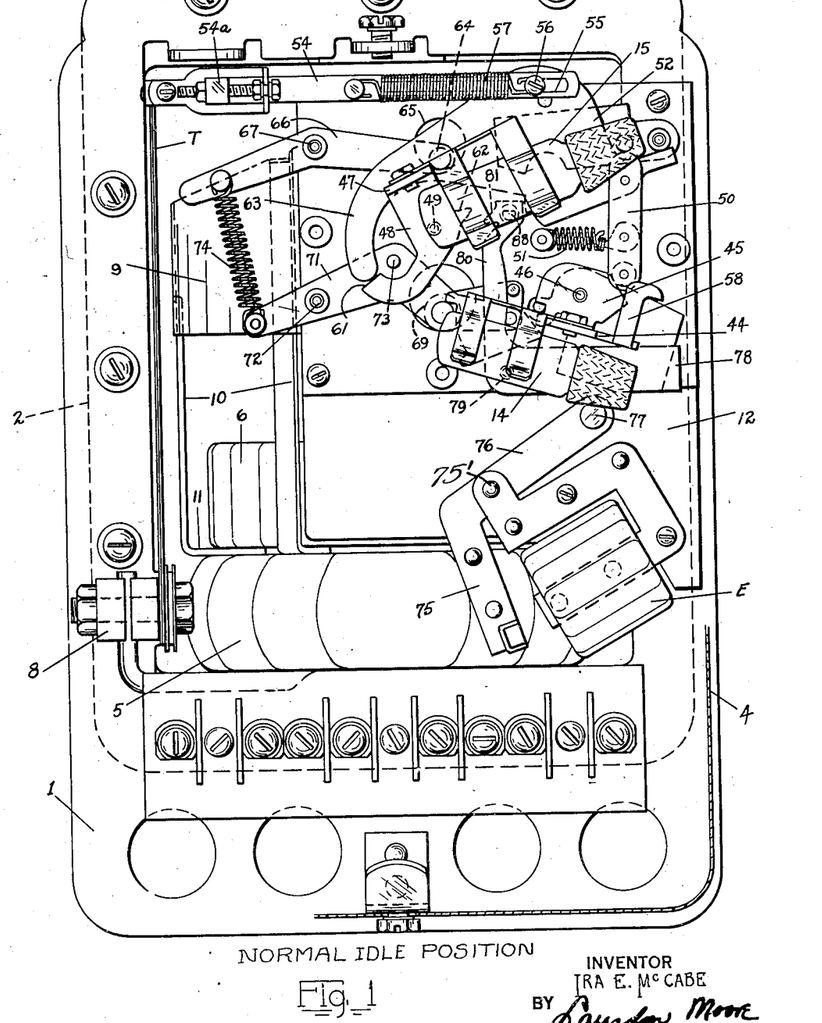
Figure 1 is a view in front elevation of the control panel, with the cover and front plate removed, of a preferred embodiment of this invention, showing the positions assumed by the respective parts when the burner is cold.
Figure 2:
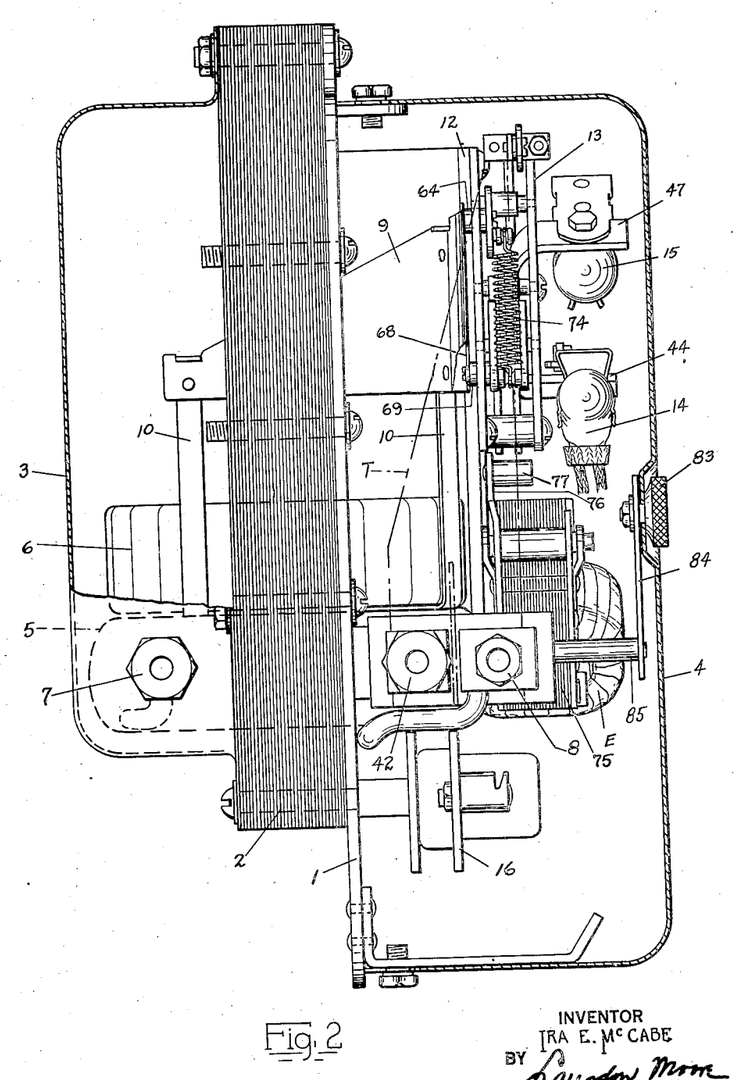
Figure 2 is a view in side elevation of the control panel, looking to the right of Figure 1, with the covers shown in section and the thermal strip shown in dot and dash lines.

Referring to Figures 1 and 2, this preferred form of this invention comprises a panel 1 for mounting the control mechanism which includes a constant current transformer for the ignition circuit, such as disclosed in this applicant's prior copending application Serial No. 331,542, filed January 10, 1929, in which the rectangular core 2 is mounted on the rear side of the panel 1, the body of the panel is cut out following the outline of the inner edges of the core 2 and the rear of the core 2 is provided with a cover 3. The mechanism on the front of the panel is protected by a cover 4 attached to the panel.

The secondary coil 5 of the constant current transformer is stationary and rests upon the bottom portion of the rectangular core 2, as shown, while the primary coil 6 is mounted thereabove and is adapted to float thereabove when energized. The respective terminals of the secondary coil 5 are connected to binding posts 7 and 8, respectively, arranged on the same side of the coil and opposite sides of the panel 1 and are adapted to be connected in the ignition circuit in a manner hereinafter described in detail.

A yoke 9 in the form of a cylinder, or partial cylinder, corresponding in outline to the outline of the primary coil 6 is mounted to reciprocate in the opening in the panel 1 and within the rectangular core 2 and is provided with a plurality of depending legs 10 each having an inturned foot 11 adapted to enter between the coils 5 and 6.

The switch operating and actuating mechanism is mounted on a base plate 12 supported upon the panel 1 spaced apart a sufficient distance therefrom to allow movement of both the primary coil 6 and yoke 9 therebehind. A front plate 13, shown in Figures 2, 5, and 6, covers part of the moving parts and is therefore omitted from the other views so as to not obscure or confuse the movements illustrated therein. The base plate 12 pivotally mounts, in a manner hereinafter described, an ignition switch 14 and a motor switch 15, both shown in full lines in Figures 1 and 2, in dot and dash lines in Figures 3 and 5 and omitted from the other views to avoid confusion with the moving parts therebehind. These switches 14 and 15 are preferably mercury tube switches of the commercial type shown.

Figure 3:
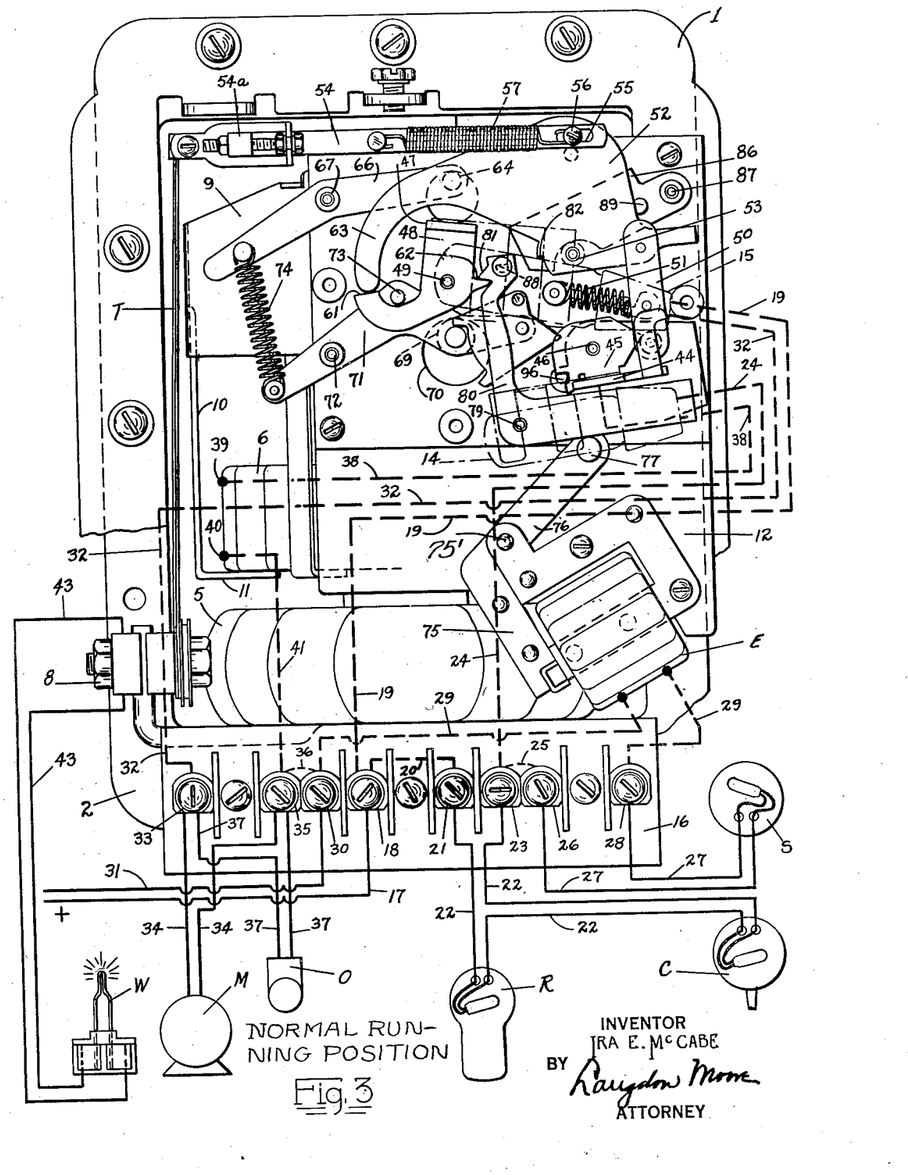
Figure 3 is a view similar to Figure 1 illustrating the positions assumed by the respective parts when the burner is normally running, including a wiring diagram illustrating the electrical connections to the various elements of the burner control system.

Referring to Figure 3 and the wiring diagram thereon, it is seen that a series of binding posts are arranged in line upon a plate 16 spaced apart from the panel 1 below the fixed secondary coil 5. The lead 17 from the commercial line is connected to the binding post 18 which post is connected by lead 19 to the motor switch 15 and also by lead 20 to binding post 21 which in turn is connected by lead 22 to a room thermostat R and thence through a boiler control C to binding post 23. Binding post 23 is connected by lead 24 to the ignition switch 14 and also by lead 25 to binding post 26 which in turn is connected by lead 27 through a switch responsive to the presence or absence of the burner flame, such as a stack switch S, to binding post 28. Binding post 28 is connected through the windings of electro-magnet E by lead 29 to binding post 30 which in turn is connected to the return lead 31 to the commercial line. The incoming current passes through lead 17 from the commercial line, binding post 18 and lead 19 to the motor switch 15 and when the switch is closed passes therefrom through lead 32 to binding post 33 and from thence through lead 34 through burner mechanism motor M to binding post 35 which is connected by lead 36 to the binding post 30 connected to the return lead 31 to the commercial line. If desired, the incoming current at binding post 33 may be caused to branch so that a portion passes through lead 37 to energize an electrically operated fuel valve O in the supply to the burner mechanism and then back to the binding post 35 and thence through lead 36, binding post 30 to return lead 31 to the commercial line. The incoming current passing from binding post 18 through lead 20, binding post 21, lead 22, through the room thermostat R and boiler control C, to binding post 23 and from thence by way of lead 24 to the ignition switch 14 passes therethrough, when closed, by way of a flexible lead 38 to one terminal 39 of the windings of the primary coil 6, through said windings to the other terminal 40 and from thence through a flexible lead 41 to binding post 35 and from there through lead 36 and binding post 30 to return lead 31 of the commercial line. The room thermostat R, the boiler control C, the stack switch S, the electrically operated fuel valve O and the burner motor M are all commercial types.

The ignition circuit remains to be traced upon the diagram on Figure 3 and requires reference to Figure 2 as well. Figure 2 shows one terminal of the windings of the stationary secondary coil attached to binding post 7 and the other terminal of the windings attached to binding post 8. Figure 2 also shows the binding post 8 also engaging one leg of a bifurcated thermal member T, illustrated in dot and dash lines, and which is shown in detail in Figure 10 and will be more fully described hereinafter. The other leg of this member T is engaged by the binding post 42 insulated from binding post 8. The ignition circuit is completed by way of lead 43 from binding post 7 through the ignition device W to binding post 42 and from thence through the legs of the bifurcated thermal member T to binding post 8. Binding posts 7 and 42 are shown only on Figure 2 as they both lie back of binding post 8 on Figure 3. In this case the ignition device W illustrated is of the hot wire type and preferably constructed in accordance with improved form disclosed in this applicant's prior copending application Serial No. 426,521, filed February 7, 1930.

The ignition switch 14 is preferably mounted in clips depending from a right angular extension 44 from the bottom of a carrier plate 45 mounted on a pivot pin 46 carried by the base plate 12. The motor switch 15 is similarly mounted in clips depending from a right angular extension 47 from the top of a carrier plate 48 mounted on a pivot pin 49 carried on the base plate 12. These switches are so arranged that when the burner mechanism is not operating or in the cold position, the ignition switch normally assumes a closed position and the motor switch an open position, as shown in Figure 1. When the room thermostat R closes the circuit from the commercial line through the control and causes the burner mechanism to operate normally, the switches are caused to assume the running position, shown in Figure 3, with the ignition switch 14 open and the motor switch 15 closed.

In a hot wire ignition system it is necessary to close the ignition switch first to bring the ignition wire to incandescence before the burner motor operates to supply fuel so that the ignition device will be operating when the fuel is first supplied and in all ignition systems the ignition device is usually caused to continue operating a predetermined time after the time the burner motor normally initially supplies fuel to insure ignition. In this control, the ignition switch is normally closed when the burner is cold so that when the room thermostat closes, the ignition device is immediately energized and then the motor switch is closed to supply fuel and a predetermined time thereafter the ignition switch is opened during normal operation of the control. To accomplish this the following constructions and arrangements of parts are contemplated. As seen from the wiring diagram on Figure 3, when the parts are in the cold position, as shown in Figure 1, the incoming current to binding post 18 cannot pass through lead 19 as the motor switch 15 is open, so it follows through lead 20, binding post 21, lead 22, through room thermostat R, when closed, boiler control C, binding post 23, lead 24, through normally closed ignition switch 14, lead 38 to terminal 39 of the primary coil 6, passing through the windings to terminal 40, energizing the coil, and through lead 41, binding post 35, lead 36, binding post 30, to the return lead 31 of the commercial line. The energization of the primary coil 6 energizes the secondary coil 5 and the induced current set up in the secondary passes from binding post 7 by way of lead 43 through the hot wire ignition device W to binding post 42 and thence through the legs of the bifurcated thermal member T to binding post 8 of the other terminal of the secondary coil.

The completion of the ignition circuit thus described accomplishes three things; first, in energizing the primary coil it causes the coil 6 to float above the stationary secondary coil 5, the position it assumes in floating above the coil 5 depends upon the intensity of the current of the commercial line and in all cases frees the feet 11 of the yoke 9 allowing an upward movement of the yoke as hereinafter described; second, in passing through the resistance wire of the ignition device W it heats the wire to incandescence and then maintains it incandescent until the circuit is broken; and, third, in passing through the legs of the bifurcated thermal member T it increases the temperature of the body thereof.

Figure 10:
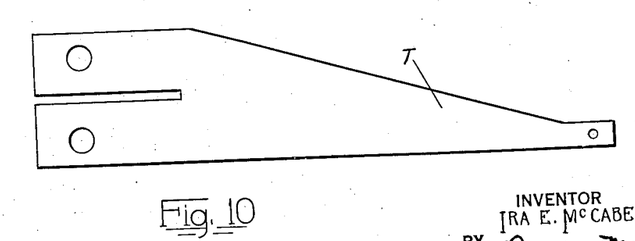
Figure 10 is a detail view of the thermal strip.

The thermal member T is formed of a strip of bimetallic metal preferably wider at its bifurcated base and tapering thereabove as shown in Figures 2 and 10 and is so constructed and arranged that as the current passes through the legs of the bifurcated portion, the extremities of this portion being each held stationary by binding posts 8 and 42, the body of the member becomes heated and the upper free end is caused to move or bend in the direction of the center of the panel 1. This movement of the free end of the thermal member T is employed to allow motor switch 15 to close and to subsequently trip the ignition switch to the open position.

The ignition switch carrier plate 45 is rotatively mounted on the pin 46 the right hand end of the plate 45 terminating in an angular projection the edges of which present two oppositely sloping surfaces over which an actuating roller carried on the free end of an actuating lever 50 is adapted to travel, the roller being maintained in contact with one sloping edge or the other of the plate by a spring 51. The other end of the actuating lever 50 is pivotally connected to an actuating member 52 in the form of a plate pivotally mounted on the pin 53 carried upon the base plate 12. Movement of the actuating member 52 about its pivot 53 imparts movement to the actuating roller and as it travels over the apex of the nose of the ignition switch carrier plate 45 it snaps it into the open or closed position, as the case may be, as disclosed in this applicant's prior Patent No. 1,734,016, dated October 29th, 1929.

The free end of the thermal member T is pivotally connected to one end of an adjustable actuating link 54, the other end of which is provided with a slot 55 adapted to receive a pin 56 on the actuating member 52 and engage the pin 56 at the ends of the slot as the link is moved thereover. A coil spring 57 is connected at one end to the pin 56 and at the other end to the body of the link 54 which normally draws the left end of the slot 55 into engagement with the pin 56. These parts are so arranged and adjusted that when the control is in the cold position, as shown in Figure 1, and the ignition switch 14 is closed the actuating roller engages the upper sloping edge of the carrier plate 45 and is held in engagement therewith by the tension of the spring 51 which also through actuating lever 50 imparts a rotative movement to the pivoted actuating member 52 so that the pin 56 thereon engages the left end of the slot 55 of the actuating link 54 and the thermal member T is in vertical position, so that when the ignition circuit is energized the passage thereof through the legs of the thermal member T causing the free end to bend or move toward the center of the panel 1 imparts through actuating link 54 a rotative movement to the right to the pivoted actuating member 52 which in turn imparts a downward movement to the actuating lever 50 causing the actuating roller thereon to travel down the upper sloping surface of the carrier plate 45 and as soon as the roller passes over the apex and engages the under sloping surface snaps the carrier plate 45 about its pivot to open the ignition switch, as shown in Figure 3.

Figure 5:
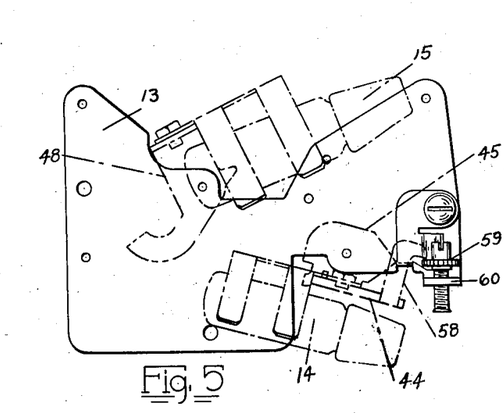
Figure 6:
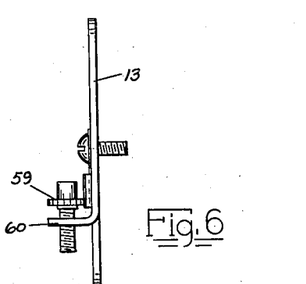
Figure 6 is a similar view in side elevation, of the means for adjusting the ignition period.

The period between the closing of the motor circuit and the opening of the ignition switch is predetermined by adjusting the length of the travel of the actuating roller over the upper sloping surface of the carrier plate 45. A means for adjusting the length of the travel is shown in Figures 5 and 6, which includes a hooked latch member 58 mounted to extend upward from the outer side of the right angular extension 44 of the ignition switch carrier plate 45 with the hook of the latch adapted to contact with an adjustable abutment 59 mounted in a right angular struck up portion 60 of the front plate 13 which will limit the downward movement of the carrier plate 45. By raising the abutment 59 the roller is caused to approach the apex and the nearer the actuating roller is to the apex of the sloping surfaces of the carrier plate the less the movement required to snap the ignition switch to the open position and vice versa. As shown in Figure 1, the adjustment is such that the actuating roller is nearly at its upper limit of travel and must move over the sloping surface before snapping the ignition switch to the open position. The movement of the ignition carrier plate 45 about its pivot in the opposite direction is limited by upper surface of the angular extension 44, which passes under the front plate 13, engaging with the edge 13' thereof.

It is necessary that the hot wire W of the ignition device be heated sufficiently to become incandescent by the time the motor switch is closed to cause the motor to supply fuel to the burner, and this period between the closing of the ignition circuit and the time the motor switch closes is referred to as the pre-heating period. This pre-heating period may be predetermined by the proper adjustment of the length of the actuating link 54, by any desired means, such as the sliding adjustment 54ª shown. The greater the travel of the free end of the thermal member T before the actuating link 54 operates the actuating member 52 and arm 63 to allow the motor switch to close, the longer the preheating period.

The above is the normal cycle of operation of the parts when the room thermostat R closes the line circuit to the control. Under normal conditions the motor switch is closed during a predetermined time before the ignition switch is automatically opened.

As heretofore stated, the motor switch is mounted on the upper side of a pivotally mounted carrier plate 48, and the portion of this plate below the pivot 49 is extended in a curve downwardly to the left and terminates in an abutment 61, as shown clearly in Figure 1, while the portion on the right, opposite the pivot 49, is provided with an outstanding nose or catch 62, as clearly shown in Figure 3. The actuating member 52 is provided with a curved actuating arm 63 projecting to the left adapted, in the cold position, to engage the abutment 61 of the motor switch carrier plate to tilt the plate about its pivot and hold the motor switch open, as shown in Figure 1.

The upper central portion of the yoke 9 adjacent the rear of the base plate 12 is provided with a fixed pin 64 passing through an opening 65 provided therefore in the base plate 12 the inner end of which is pivotally connected to one end of a lifting lever 66 which lever is mounted intermediate its length upon a pivot 67 mounted adjacent the left edge of the base plate 12. The lower portion of the yoke 9 is provided with a vertical slot 68 in line with the pin 64 adapted to receive and in the cold position engage at its bottom a pin 69, passing through an aperture 70 provided therefore in the base plate 12, carried on a coacting lifting lever 71. This coacting lifting lever 71 is in the shape of a bell crank lever only it is pivoted intermediate the length of the arm opposite that carrying the pin 69 upon a pivot pin 72 mounted adjacent the left edge of the base plate 12 and in line directly below the pivot 67 of the lifting lever 66. The apex of the lever 71 is above its pivot 72 and carries a stud 73 which in the cold position extends over and above the curved extension to the abutment 61 of the motor switch carrier plate 48 and prevents the closing thereof.

The weight of the primary coil is sufficient when in deenergized position upon the feet 11 to hold the yoke 9 with its feet in engagement with the stationary secondary coil 5, as shown in Figure 1. The portions of the lifting lever 66 and coacting lifting lever 71 extend unequally to the left of their respective pivots 67 and 72 while the distance from these pivots to the respective pins 64 and 69 upon the inner ends of the respective levers is the same. As shown in Figure 1, the upper lifting lever 66 extends a greater distance to the left than the lower cooperating lifting lever 71 and the left end portions are connected by a coil spring 74 its upper end being at a greater distance from pivot 67 than the distance of its lower end from pivot 72 so that the tension of the spring will cause an upward movement to be imparted through pin 64 to the yoke 9 when the primary coil 6 is energized and floats above the stationary secondary coil 5. The upward movement of the yoke 9 is limited by its fixed pin 64 engaging the upper side of the aperture 65 in the base plate 12.

The normal voltage of the commercial line circuit is sufficient to cause the primary coil 6 to float above the feet 11 of the yoke 9 as the yoke 9 assumes its upper position in which position it is held during normal operation before the coil 6 is deenergized. To absorb the shock of the falling of the coil 6, when deenergized, upon the feet 11, and thereby prevent any undue strains upon any of the parts of the control mechanism, the slot 68 is provided in the yoke 9 to receive the pin 69 and allow a reciprocation of the yoke 9 thereover against the tension of the spring 74.

The upward movement of the yoke 9 changes the relative positions of both lifting lever 66 and coacting lifting lever 71 so that the stud 73 upon lever 71 is moved upward away from the projection of the carrier plate 48. The weight of motor switch being supported to the right of the pivot 49 of its carrier plate would normally rotate the motor switch to closed position but the abutment 61 of the carrier plate engages the arm 63 of the actuating member 52 which remains in the position shown in Figure 1 until the heating of the thermal member T causes it to move about its pivot which raises the end of the actuating arm 63 contacted by the abutment 61, and as this movement takes place the motor switch gradually approaches and finally assumes the closed position shown in Figure 3.

It is therefore seen that the closing of the room thermostat R first energizes the ignition circuit, and the floating of the primary coil 6 and simultaneous heating of the thermal member T coact to first close the motor circuit and then the heating of the thermal member automatically opens the ignition circuit. The opening of the ignition circuit deenergizes the floating coil 6 and its weight would depress the yoke 9 causing stud 73 upon lever 71 to engage and rotate the motor switch carrier plate 48 to open the motor switch. To prevent such action provision is made to lock the motor switch when once closed and hold it closed during the normal operation of the burning mechanism, as hereinafter described.

Again referring to the wiring diagram on Figure 3, it is seen that when the motor switch is closed, the incoming current at binding post 18 branches and part passes through lead 19, closed motor switch 15, lead 32, burner motor M, binding post 35, lead 36 and binding post 30 to return lead 31 to the commercial line, and at the same time through lead 37 energizes the electrically operated valve O in the fuel supply to cause it to open.

As the ignition circuit is closed when the motor M starts and remains closed a predetermined time thereafter, sufficient time is allowed to ignite the fuel and the flame therefrom to close the stack switch S, whereupon a portion of the incoming current passes from binding post 23 by the way of lead 25, binding post 26, lead 27, closed stack switch S, binding post 28, leads, 29, through windings of electro-magnet E to binding post 30 and return lead 31 to the commercial line.

The electro-magnet E is provided with a pivoted armature 75 pivoted at 75' having an extension 76 mounting at its free end an actuating stud 77 which when the armature is closed, by the energizing of the magnet E, is caused to engage the under side of a weighted arm 78 of a bell crank locking lever pivoted at its apex on the pivot pin 79 mounted on the base plate 12 and rotate the same about its pivot. The other arm 80 of the crank lever is provided adjacent its free end with a depression on the side adjacent the motor switch carrier plate to form a latch 81 so that when the motor switch is closed and the magnet E is energized the projecting catch 62 on the motor switch carrier plate is engaged within the depression and held by the latch 81 from counter revolution to open position.

After the parts 62 and 81 engage and lock the motor switch in closed position the ignition switch is opened and as long as the magnet E remains energized it will hold the parts locked, as above described, which will through stud 73 engaging the upper side of the immovable carrier plate 48 of the motor switch and tension of lifting spring 74 maintain the yoke 9 in its uppermost position supporting the primary coil 6 upon its feet 11, as shown in Figure 3.

When the ignition circuit is opened, the thermal member T gradually cools, the actuating member 52 having opened the ignition switch is locked from counter revolution by the engagement of the actuating arm 63 with the abutment 61 of the locked motor switch carrier plate 48, and actuating link 54 is allowed to move to the left as the member T cools by the slot 55 passing over the pin 56 on the locked actuating member 52, and place the spring 57 under tension.

The above description of the movement of the parts from cold to normal running position is under normal conditions, that is the fuel is promptly supplied and ignited and the switch responsive to the presence of the flame closes normally while the boiler control remains closed and the current from the commercial line is uninterrupted.

It is to be noted here, that should the fuel fail to ignite during the period the ignition circuit is energized the stack switch S, which is normally open, will not close the circuit through the holding magnet E, so that the latch 81 will not engage the catch 62 of the motor switch carrier plate 48. Therefore, when the primary coil is deenergized by the normal operation of the thermal member T, actuating link 54 and actuating member 52 opening the ignition switch 14, the weight of the coil upon the yoke 9 will depress the yoke which through engagement of the stud 73 with carrier plate 48 of the motor switch 15 will tilt the motor switch to open the motor circuit. Unless the actuating arm 63 of the actuating member 52 is prevented from following the downwardly moving abutment 61 as the carrier plate 48 tilts, the ignition switch 14 will be returned to closed position and the operation repeated indefinitely. To prevent this, the actuating member 52 is provided with a shoulder 82 adapted to wipe over the top of the arm 80 of the locking lever which, since the holding magnet E has remained deenergized, remains in its normal position, as shown in Figure 4, as the actuating member during its normal operation opens the ignition switch, so that the end of the arm 80 engages the shoulder 82 as the thermal member T cools and prevents counter rotation of the actuating member 52 and when the yoke 9 drops and opens the motor switch 15, the ignition switch 14 is locked in open position and the control must be manually reset before the burner mechanism can again be made to operate.

Figure 4:
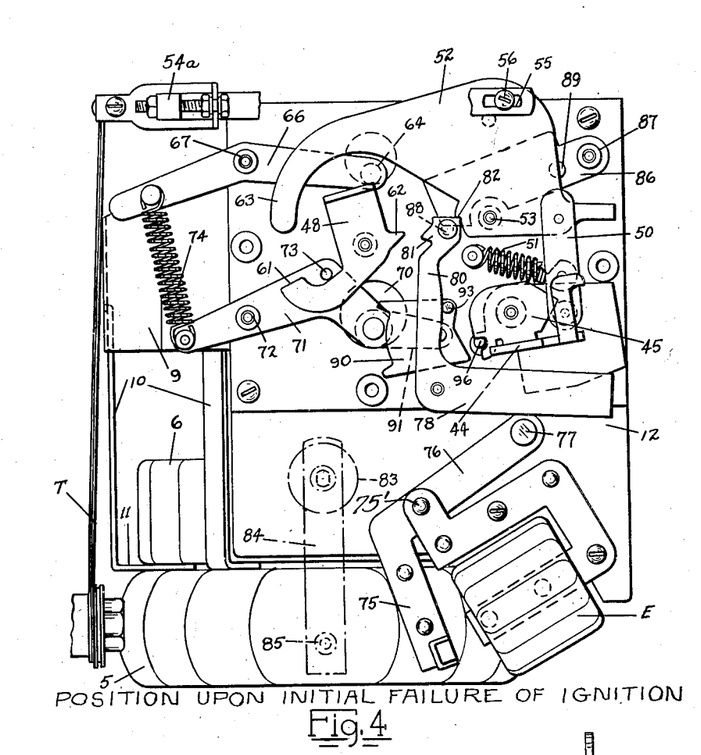
Figure 4 is a detail view in front elevation illustrating the positions assumed by the respective parts in case of initial ignition failure, omitting the motor and ignition switches.

The manual reset device is shown in side elevation in Figure 2 and in dot and dash lines in Figure 4. It includes a knurled knob 83 mounted on a shaft passing through the cover plate 4 which mounts on the interior of the cover plate an arm 84 carrying on its free end a pin 85 which upon rotation of the knob 83 will contact the armature 75 of the holding magnet E to cause the stud 77 to engage the arm 78 and rotate the locking lever to move the end of the arm 80 out of engagement with the shoulder 82 to release the actuating member 52 to complete its normal operation and close the ignition switch 14, and all the parts will be in the cold position, as shown in Figure 1.

When the burner mechanism has been caused to operate normally by the closing of the room thermostat R and the parts are in the running position shown in Figure 3 and the desired temperature has been obtained, the room thermostat R will open the circuit therethrough, and therefore the current which has been passing through the boiler control C, stack switch S and holding magnet E ceases.

The breaking of the circuit through the holding magnet E releases the locking lever so that latch 81 disengages catch 62 allowing the weight of the coil 6 and yoke 9 to tilt the motor switch 15 to open position. To allow the arm 63 of the actuating member 52 to follow the abutment 61 of the carrier plate 48 as its tilts without engaging the shoulder 82 on the actuating member with the top of arm 80, as occurs when initial ignition fails, a re-start plate 86 is provided, pivoted at one end on a pin 87 mounted on the upper right corner of the base plate 12, and so formed as to normally rest upon the pivot 53 of the actuating member 52, when the parts are in the running position shown in Figure 3, with a portion extending beyond the shoulder 82 to be engaged by a pin 88, adjacent the end of the arm 80, when moved to release latch 81 from catch 62, and prevent the said end from engaging the shoulder 82 on the actuating plate.

The weight of the actuating member 52 being to the left of its pivot 53, assisted by the tension of the spring 57 on the actuating link 54 upon the pin 56 on the actuating member, and the tension of the spring 51 acting upon the actuating lever 50, unite to cause the actuating member to rotate with the arm 63 thereof following the tilting abutment 61 and causing the actuating roller to pass over the apex of the nose of the ignition switch carrier 45 to close the ignition switch and at the same time the upward movement imparted to the pivoted end of the actuating lever 50 engages a stud 89 on the re-start plate 86 lifting the free end thereof to clear the pin 88, as shown in Figure 1. The ignition switch being returned to closed position and the motor switch open, the parts are in position to re-start the burner mechanism upon the closing of the room thermostat R.

In case the burner flame fails for any reason after initial ignition and the parts of the control have assumed the normal running position shown in Figure 3, the stack switch S will open breaking the circuit through the holding magnet E, whereupon the parts will assume the cold position the same as if the room thermostat had opened. However, the room thermostat R being closed as soon as the ignition switch is brought to closed position again the thermal member T will heat and the motor switch released to close by the upward moving yoke 9, and the re-start plate 86 being lifted when the actuating member 52 closed the ignition switch the second time allowing the end of the arm 80, while the holding magnet E is deenergized to enter under the shoulder 82 of the actuating member 52 as the ignition switch is opened the second time and the parts will assume the position shown in Figure 4 and require a manual reset before the burner mechanism can be again operated, in the same manner as if ignition has initially failed.

A safety control for a liquid fuel burner should provide means upon an interruption of the line current to shut down the burner motor a sufficient time to allow the unburned vapors of the fuel to leave the combustion chamber before again discharging the fuel thereinto. This invention contemplates to compensate for a current interruption in the following manner:

A current interruption occurring while the room thermostat is open does not affect the control except that should the thermostat close during the interruption the burner mechanism could not be started until the current was resumed and then the control would function normally to start the burner.

Figure 7:
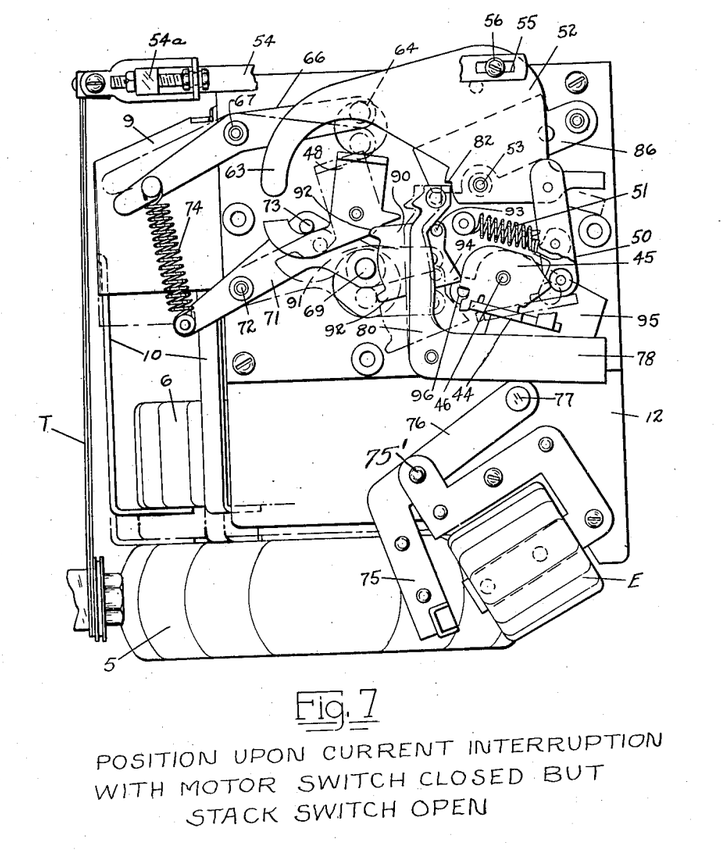
Figure 7 is a view similar to Figure 4 illustrating the positions assumed by the respective parts in case of a current interruption at a certain time.

In case the current interruption occurred with the room thermostat R closed and after the motor switch had been normally closed but before the stack switch S closes, the holding magnet E would not be energized to lock the motor switch carrier 48 in the closed position, as shown in full lines in Figure 7, so that as soon as the current ceased the primary coil 6 would be deenergized, drop upon the feet 11 and depress the yoke 9 immediately tilting the motor switch carrier 48 through pin 73 to open the motor switch, as shown in dot-and-dash lines in Figure 7. The failure of the current deenergizes the ignition circuit and therefore the thermal member T would cool and cause the shoulder 82 to engage the upper end of arm 80 as in case of an initial failure of ignition, as shown in Figure 4, and necessitate a manual reset. This is not desirable and to prevent this locking of the parts a pawl 90 is pivotally mounted upon the free end of a pawl carrying continuation 91 of the cooperating lever 71, as shown in Figure 7. The pawl 90 approximates a square in shape and is pivoted intermediate and adjacent its right edge with the left edge cut away to form a stop 92 at each left corner adapted to engage a projection of the pin 69 carried on the cooperating lever 71 on that side to limit the movement of the pawl 90 about its pivot. The pawl 90 is also provided with a stud 93 at its upper right corner adapted under certain conditions to engage the arm 80 and at its lower right corner with a projection or nose 94. A counter weight to normally tilt the ignition switch into closed position, if spring 51 were released, in the form of a plate 95 is attached to the carrier plate 45 and mounts a stud 96 which lies in the path of travel of the nose 94 of the pawl 90.

When the yoke 9 drops from the full line position to the dot and dash position shown in Figure 7 it not only tilts the motor switch carrier 48 through pin 73 to open the motor switch by the downward movement imparted to the cooperating lever 71 but also carries the pawl 90 to the dot and dash line position. At the start of this movement the ignition switch is in closed position with the nose 94 of the pawl above the stud 96. The downward movement of the prolongation of the cooperating lever 71 causes the nose 94 to engage the stud 96 whereby the stud 93 of the pawl 90 engages the arm 80 moving the end of the arm 80 out of the path of the shoulder 82 of the actuating member 52 and then ride over the surface of the arm 80 as the nose 94 swings the carrier plate 45 about its pivot until the actuating roller of the actuating lever 50 passes over the apex of the nose of the carrier plate and snaps it into the open position of the ignition switch, as shown in dot and dash lines in Figure 7. Therefore as the thermal member T cools, the parts all assume the cold position shown in Figure 1.

As soon as the current is interrupted the circuit through the primary coil 6 is broken and it immediately drops and the motor switch and ignition switches are immediately both tilted into open position and the thermal element must cool and return the ignition switch to closed position before any resumption of current can again operate the control to start the burner mechanism.

Figure 8:
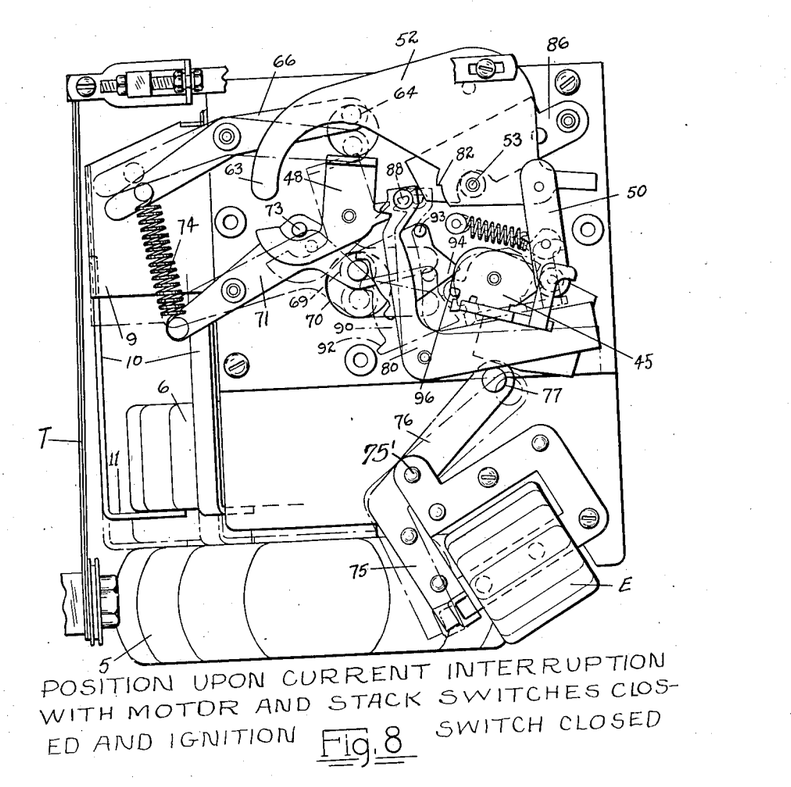
Figures 8 and 9 are views similar to Figure 7 when the current interruption occurs at other times during the actuation of the control.

In case the current interruption occurs when the thermostat R has closed and the stack switch closed, as normally, but before the ignition switch has been moved to open position, the parts will be in the position shown in full lines in Figure 8 and the dropping of the coil 6 will at the same time the holding magnet E is deenergized, trip the ignition carrier plate 45 to open the ignition switch by the movement of the pawl 90 and the reset plate 86 having fallen below stud 88 will hold the end of arm 80 out of engagement with the shoulder 82 of the actuating member 52, as shown in dot and dash lines, whereby as the thermal member T cools the actuating member 52 will normally snap the ignition switch into closed position so that the parts will be returned to the normal cold position and upon resumption of current at any time after the interruption, the control will normally act to start the burner mechanism.

Figure 9:
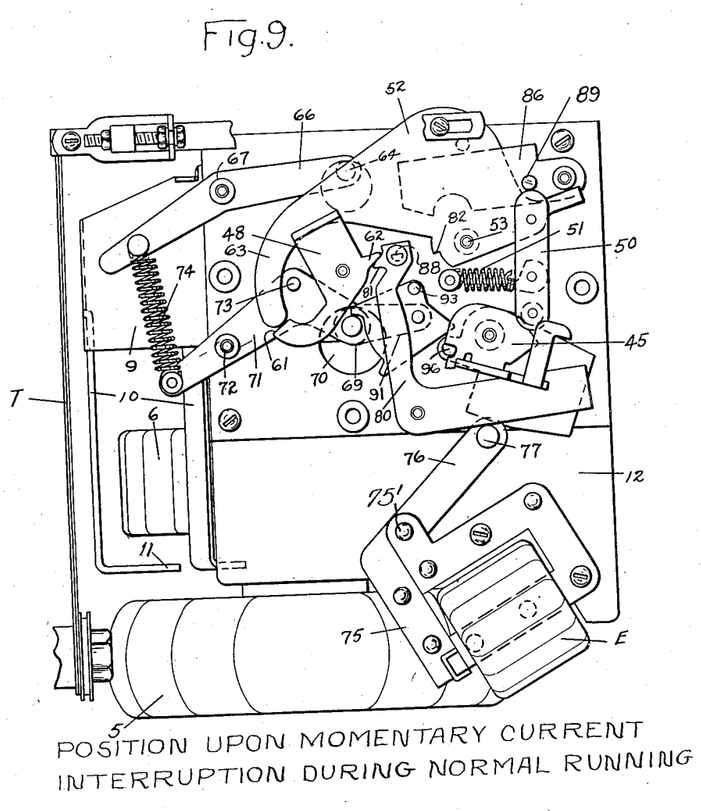

In case there is a current interruption while the burner is normally operating and immediately resumes before the stack switch opens or in case the room thermostat R is manually operated to first open the circuit and then close it, the parts being in the normal running position as shown in Figure 3, the ignition switch is open and the motor switch is locked in closed position by the holding magnet the momentary interruption will momentarily disengage the holding magnet E and as the armature thereby is momentarily freed, the weight of the coil 6 will cause the yoke to drop as the latch 81 momentarily frees the catch 62 of the motor switch carrier 48 so that the yoke 9 tilts the carrier 48 to open the motor switch at the same time allowing the actuating member 52 to snap the ignition switch into closed position and the immediate reenergizing of the holding magnet E causes the latch 81 to engage under the catch 62, as shown in Figure 9, and lock it in that position until the stack switch cools and deenergizes the holding magnet E to allow the arm 80 to resume its normal position and thereby release the motor switch carrier 48 and allow it to normally close the motor switch when the actuating arm 63 has been removed from contact with abutment 61. The closing of the ignition switch causes the coil 6 to float and the yoke 9 to ascend and in so doing the pawl 90 being pivoted in ascending wipes its nose 94 over the stud 96. The control then continues its normal cycle and opens the ignition switch and the parts again assume the running position.

In each of the three instances of current interruption above described the control is caused to recycle upon current resumption and start the burner mechanism to recycle upon current resumption and start the burner mechanism to operate normally without a manual reset of the control. Also in each instance there is first a shut down of the burner as the motor switch is opened and the time consumed from the interruption and shut down to the end of the recycling operation of the control is sufficient to free the combustion chamber of unburned fuel vapors so that there is no danger when the fuel is again supplied.

What I claim is:

1. A control for an electrically operated fluid fuel burner mechanism including a constant current transformer having a coil that will float when the transformer is energized, and means controlled by the movement of the floating transformer coil to permit the operation of the burner mechanism.

2. A control for an electrically operated fluid fuel burner mechanism including a constant current transformer having a coil that will float when the transformer is energized, and means controlled by the movement of the floating transformer coil to permit and stop the operation of the burner mechanism.

3. A control for an electrically operated fluid fuel burner mechanism having a burner motor including a constant current transformer, a switch in the motor circuit normally open, and means operable upon energization of the transformer to close said switch to operate the burner mechanism, thereafter break the circuit through the transformer and means operable upon establishment of combustion to maintain the circuit through the motor.

4. A control for an electrically operated fluid fuel burner mechanism having a burner motor including a constant current transformer, a switch in the motor circuit normally open, and means operable upon energization of the transformer to close said switch to operate the burner mechanism, thereafter breaking the circuit through the transformer, and means responsive to combustion to maintain the circuit through the motor, said first means including a switch in the transformer circuit normally closed and operable to automatically open a predetermined time after the transformer has been energized.

5. A control for an electrically operated fluid fuel burner mechanism having a burner motor including a constant current transformer, a switch in the motor circuit normally open, and means operable upon energization of the transformer to close said switch to operate the burner mechanism, thereafter break the circuit through the transformer, and combustion responsive means to maintain the circuit through the motor, said first means including a switch in the transformer circuit normally closed and operable to automatically open a predetermined time after the transformer has been energized, and further including a thermal member in the transformer circuit actuated by the passage of the current therethrough to cooperate with and open the switch in the transformer circuit.

6. A control for an electrically operated fluid fuel burner mechanism having a burner motor including a constant current transformer, a switch in the motor circuit normally open, means operable upon energization of the transformer to close said switch to operate the burner mechanism, thereafter breaking the circuit through the transformer and combustion responsive means to maintain the circuit through the motor, said first means including a switch in the transformer circuit normally closed and operable to automatically open a predetermined time after the transformer has been energized, and further including a thermal member in the transformer circuit actuated by the passage of the current therethrough to cooperate with and open the switch in the transformer circuit.

7. A control for an electrically operated fluid fuel burner mechanism including a constant current transformer having a coil that will float when the transformer is energized, and means controlled by the floating of the transformer coil to permit the operation of the burner mechanism, including a normally open motor switch; and means operable upon energization of the transformer and upon the floating of the coil to close the motor switch and lock said switch closed during normal operation of the burner.

8. A control for an electrically operated fluid fuel burner mechanism including a constant current transformer having a coil that will float when the transformer is energized, and means controlled by the floating of the transformer coil to permit the operation of the burner mechanism, including a normally open motor switch; and means operable upon energization of the transformer and the floating of the coil to close the motor switch and lock said switch closed and support the said coil during normal operation of the burner.

9. A control for an electrically operated fluid fuel burner mechanism including a constant current transformer having a coil that will float when the transformer is energized, and means controlled by the floating of the transformer coil to permit the operation of the burner mechanism, including a normally open motor switch, and means operable upon energization of the transformer and the floating of the coil to close the motor switch and lock said switch closed and support the said coil, and means actuated upon cessation of operation of the burner by the weight of the supported coil to open the motor switch.

10. A control for an electrically operated fluid fuel burner mechanism having a burner motor including a constant current transformer having a movable coil, a switch in the motor circuit normally open, a switch in the transformer circuit normally closed, and means operable upon energization of the transformer to close the motor switch to operate the burner mechanism, thereafter break the circuit through the transformer and maintain the circuit through the motor, including a spring pressed member depressed by the weight of the movable coil of the transformer when the circuit to the control is open and operating upon closing the circuit and floating of said coil to release the motor switch for closing motion and further including means to close the motor switch and open said transformer switch and means to lock said member to support the said coil in its floating position upon the opening of the transformer switch, said member upon the breaking of the control circuit actuated by the weight of the supported coil to actuate the motor switch to open.

11. A control for an electrically operated fluid fuel burner mechanism having a burner motor including a constant current transformer, a switch in the motor circuit normally open, means operable upon energization of the transformer to close the motor switch to operate the burner mechanism, thereafter break the circuit through the transformer and maintain the circuit through the motor; said means including a switch in the transformer circuit normally closed a thermal member in the transformer circuit actuated by the passage of the current therethrough to open the switch in the transformer circuit after a predetermined time, and means operable during the normal operation of the burner mechanism to lock the motor switch in closed position during the continued normal operation of said mechanism, including a switch responsive to the presence of the burner flame and a holding magnet in circuit with the source of electricity adapted when said latter switch is closed to energize the magnet to lock the motor switch.

12. A control for an electrically operated fluid fuel burner mechanism having a burner motor including a constant current transformer, a switch in the motor circuit normally open, means operable upon energization of the transformer to close the motor circuit to operate the burner mechanism, thereafter break the circuit through the transformer and maintain the circuit through the motor, said means including a switch in the transformer circuit normally closed a thermal member in the transformer circuit actuated by the passage of the current therethrough to open the switch in the transformer circuit after a predetermined time, and means operable during the normal operation of the burner mechanism to lock the motor switch in closed position during the continued normal operation of said mechanism, including a normally open switch operable to close upon ignition of the fuel, a holding magnet in series therewith, and means actuated by energizing the magnet to lock the motor switch, said means releasing said motor switch upon deenergization of said magnet.

13. A control for an electrically operated fluid fuel burner mechanism having a burner motor including a constant current transformer having a floatable coil, an electrical ignition device connected in circuit with one coil thereof, a normally closed ignition switch connected in circuit with the other coil thereof, a normally open switch connected in the motor circuit, a holding magnet, a normally open combustion switch adapted to close upon ignition of the fuel in circuit with said magnet and source of electricity, means for opening and closing the ignition and motor switches including: a movable member normally held from movement by the weight of the deenergized floatable coil of the transformer, means upon said member for moving and holding the motor switch open in assuming the deenergized position, thermal means in the ignition circuit for actuating the ignition switch and releasing said motor switch to open, means actuated upon closing the circuit to the control to impart movement to said moveable member as the energized transformer coil floats thereabove, to release the motor switch to open, said thermal member a predetermined time thereafter operating to open the ignition switch and allow therebefore the motor switch to close; said combustion switch upon ignition of the burner flame energizing the holding magnet to lock the motor switch in open position and hold the moveable member in its moved position supporting the weight of the deenergized floating coil of the transformer.

14. A control for an electrically operated fluid fuel burner mechanism having a burner motor including a constant current transformer having an immovable secondary and a movable primary coil, an electric ignition device connected in circuit with the immovcuit, a holding magnet, a combustion switch connected in circuit with the moveable primary coil thereof, a switch in the motor circuit, a holding magnet, a combustion switch responsive to the presence of the burner flame in circuit with the holding magnet and source of electricity, switch operating mechanism for the ignition switch, switch operating mechanism for the motor switch, a spring-pressed member having a connection with the motor switch operating mechanism and connected to be normally depressed by the weight of the dead primary coil to hold the motor switch open, a thermal member in the ignition circuit having an operative connection to the ignition switch mechanism, acting when cold to close the ignition switch and also connected to hold the motor switch open, whereby upon closing the circuit to the control, the transformer is energized, the floating of the primary coil releases the spring-pressed member to release the motor switch, the secondary ignition circuit causes the ignition device to operate and begins to heat the thermal member heating movement of which acts to operate the switch mechanisms to first release and allow the motor switch to close and then open the ignition switch, the presence of the flame of the ignited fuel causing said combustion switch to close the circuit to the holding magnet, and means actuated by the energizing of the holding magnet to engage and lock the motor switch mechanism with the motor switch closed before the ignition switch opens and thereby lock the spring-pressed member to support the weight of the floating coil as the ignition switch is opened and prevent the cooling movement of the thermal member closing the ignition switch.

15. A control for an electrically operated fluid fuel burner mechanism having a burner motor including a constant current transformer having an immovable secondary and a movable primary coil, an electric ignition device connected in circuit with the immovable secondary coil thereof, an ignition switch connected in circuit with the moveable primary coil thereof, a switch in the motor circuit, a holding magnet, a combustion switch responsive to the presence of the burner flame in circuit with the holding magnet and source of electricity, switch operating mechanism for the ignition switch, switch operating mechanism for the motor switch, a spring-pressed member having a connection with the motor switch operating mechanism and connected to be normally depressed by the weight of the dead primary coil to hold the motor switch open, a thermal member in the ignition circuit having an operative connection to the ignition switch mechanism, acting when cold to close the ignition switch and also connected to hold the motor switch open, whereby upon closing the circuit to the control, the transformer is energized, the coating of the primary coil releases the spring-pressed member to release the motor switch, the secondary ignition circuit causes the ignition device to operate and begins to heat the thermal member, heating movement of which acts to operate the switch mechanisms to first release and allow the motor switch to close and then open the ignition switch, the presence of the flame of the ignited fuel causing said combustion switch to close the circuit to the holding magnet, and means actuated by the energizing of the holding magnet to engage and lock the motor switch mechanism with the motor switch closed before the ignition switch opens and thereby lock the spring-pressed member to support the weight of the floating coil as the ignition switch is opened and prevent the cooling movement of the thermal member closing the ignition switch, and upon thereafter opening the circuit to the control, the deenergizing of the holding magnet releases the motor switch, whereupon the weight of the dead coil depresses the spring-pressed member to open and hold the motor switch open, and allows the ignition switch mechanism to close the ignition switch.

16. A control for an electrically operated fluid fuel burner mechanism having a burner motor including a constant current transformer having an immovable secondary and a movable primary coil, an electric ignition device connected in circuit with the immoveable secondary coil thereof, an ignition switch connected in circuit with the moveable primary coil thereof, a switch in the motor circuit, a holding magnet, a combustion switch responsive to the presence of the burner flame in circuit with the holding magnet and source of electricity, switch operating mechanism for the ignition switch, switch operating mechanism for the motor switch, a spring-pressed member having a connection with the motor switch operating mechanism and connected to be normally depressed by the weight of the dead primary coil to hold the motor switch open, a thermal member in the ignition circuit having an operative connection to the ignition switch mechanism, acting when cold to close the ignition switch and also connected to hold the motor switch open, whereby upon closing the circuit to the control, the transformer is energized, the floating of the primary coil releases the spring-pressed member to release the motor switch, the secondary ignition circuit causes the ignition device to operate and begins to heat the thermal member the heating movement of which acts to operate the switch mechanisms to first release and allow the motor switch to close and then open the ignition switch, the presence of the flame of the ignited fuel causes said combustion switch to close the circuit to the holding magnet, and means actuated by the energizing of the holding magnet to engage and lock the motor switch mechanism with the motor switch closed before the ignition switch opens and thereby lock the spring-pressed member to support the weight of the floating coil as the ignition switch is opened and prevent the cooling movement of the thermal member closing the ignition switch, said means upon failure of energization of the holding magnet being operative to engage the ignition switch mechanism and prevent the closing of the ignition switch, whereby the weight of the dead coil upon the opening of the ignition switch depresses the spring-pressed member and opens and hold the motor switch open until said holding magnet actuating means is manually operated to release the ignition switch mechanism to again close the ignition switch.

17. A control for an electrically operated fluid fuel burner mechanism having a burner motor including a constant current transformer having an immovable secondary and a movable primary coil, an electric ignition device connected in circuit with the immoveable secondary coil thereof, an ignition switch connected in circuit with the moveable primary coil thereof, a switch in the motor circuit, a holding magnet, a combustion switch responsive to the presence of the burner flame in circuit with the holding magnet and source of electricity, switch operating mechanism for the ignition switch, switch operating mechanism for the motor switch, a spring-pressed member having a connection with the motor switch operating mechanism and connected to be normally depressed by the weight of the dead primary coil to hold the motor switch open, a thermal member in the ignition circuit having an operative connection to the ignition switch mechanism, acting when cold to close the ignition switch and also connected to hold the motor switch open, whereby upon closing the circuit to the control, the transformer is energized, the floating of the primary coil releases the spring-pressed member to release the motor switch, the secondary ignition circuit causes the ignition device to operate and begins to heat the thermal member the heat movement of which acts to operate the switch mechanisms to first release and allow the motor switch to close and then open the ignition switch, the presence of the flame of the ignited fuel causes said combustion switch to close the circuit to the holding magnet, and means actuated by the energizing of the holding magnet to engage and lock the motor switch mechanism with the motor switch closed before the ignition switch opens and thereby lock the spring-pressed member to support the weight of the floating coil as the ignition switch is opened and prevent the cooling movement of the thermal member closing the ignition switch, and upon interruption of current to the control after the motor switch is closed and the holding magnet energized but before the ignition switch is opened, the holding magnet and floating coil are both deenergized whereby the holding magnet actuated means releases the motor switch mechanism and the weight of the dead coil depresses the spring-pressed member to open and hold the motor switch open and actuates additional means provided for operating the ignition switch mechanism to open the ignition switch and then allow the thermal member to close the ignition switch, whereupon the resumption of current will again actuate the control.

18. A control for an electrically operated fluid fuel burner mechanism having a burner motor including a constant current transformer having an immovable secondary and a movable primary coil, an electric ignition device connected in circuit with the immoveable secondary coil thereof, an ignition switch connected in circuit with the moveable primary coil thereof, a switch in the motor circuit, a holding magnet, a combustion switch responsive to the presence of the burner flame in circuit with the holding magnet and source of electricity, switch operating mechanism for the ignition switch, switch operating mechanism for the motor switch, a spring-pressed member having a connection with the motor switch operating mechanism and connected to be normally depressed by the weight of the dead primary coil to hold the motor switch open, a thermal member in the ignition circuit having an operative connection to the switch mechanisms acting when cold to close the ignition switch and also hold the motor switch open, whereby upon closing the circuit to the control, the transformer is energized, the floating of the primary coil releases the spring-pressed member to release the motor switch, the secondary ignition circuit causes the ignition device to operate and begins to heat the thermal member the heating movement of which acts to operate the switch mechanisms to first release and allow the motor switch to close and then open the ignition switch, the presence of the flame of the ignited fuel causes said combustion switch to close the circuit to the holding magnet, and means actuated by the energizing of the holding magnet to engage and lock the motor switch mechanism with the motor switch closed before the ignition switch opens and thereby lock the spring-pressed member to support the weight of the floating coil as the ignition switch is opened and prevent the cooling movement of the thermal member closing the ignition switch, and upon a momentary interruption of current to the control when the burner mechanism is normally operating, a momentary deenergization of the holding magnet and floating coil occurs and causes a release of the motor switch and the weight of the dead coil to depress the spring-pressed member to open the motor switch and allow the ignition switch mechanism to close the ignition switch, and the immediate re-energization of the holding magnet actuates the motor switch locking mechanism to lock the motor switch in open position, whereupon combustion ceases and thereafter the holding magnet is deenergized to release the motor switch and the control re-cycles in going through the movements of a normal start.

IRA E. McCABE.

CERTIFICATE OF CORRECTION.

Patent No. 1,881,321.      October 4, 1932.

IRA E. McCABE.

It is hereby certified that error appears in the printed specification of the above numbered patent requiring correction as follows: Page 11, line 7, claim 14, strike out the syllable and words "cuit, a holding magnet, a combustion" and insert instead the syllable and words "able secondary coil thereof, an ignition", and lines 72 and 73, claim 15, for "coating" read "floating"; and that the said Letters Patent should be read with these corrections therein that the same may conform to the record of the case in the Patent Office.

Signed and sealed this 28th day of February, A. D. 1933.

(Seal)      M. J. Moore,
Acting Commissioner of Patents.